March 8, 1932.  D. B. OLIVER  1,849,017
HINGE
Filed Feb. 15, 1930
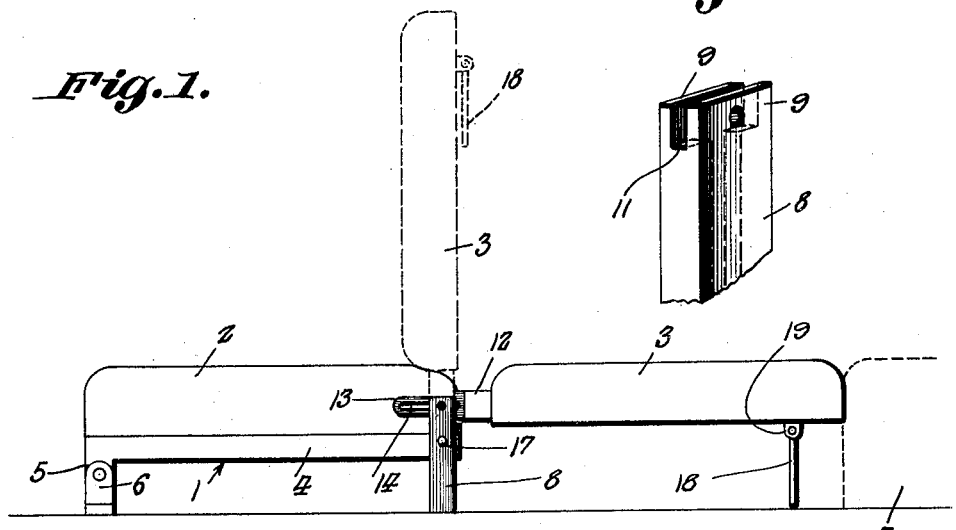
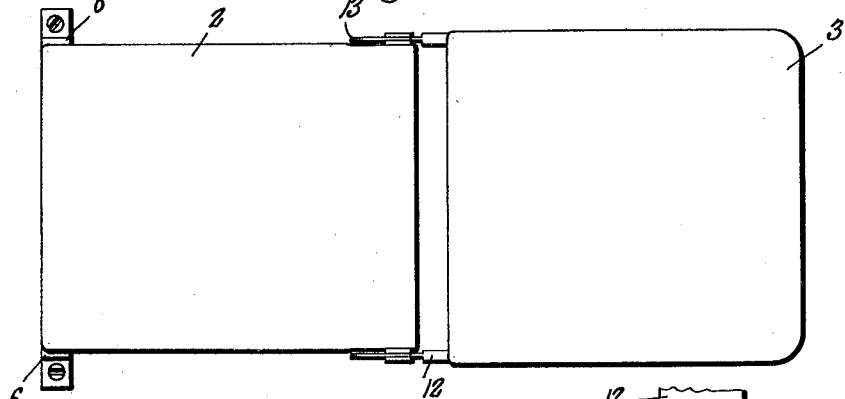
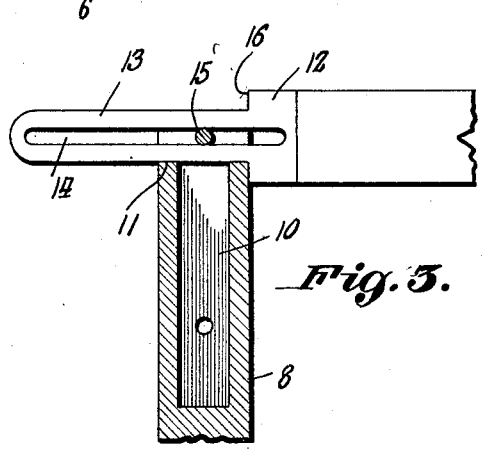
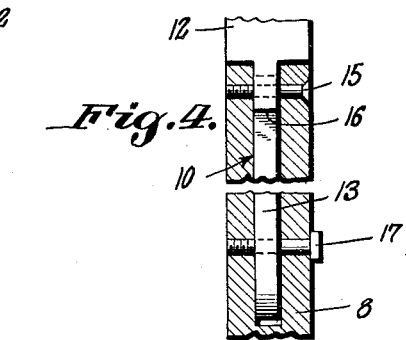
D. B. Oliver, INVENTOR
BY Victor J. Evans
ATTORNEY Patented Mar. 8, 1932

1,849,017

UNITED STATES PATENT OFFICE

DAN B. OLIVER, OF LUMBERTON, NORTH CAROLINA

HINGE

Application filed February 15, 1930. Serial No. 428,814.

This invention relates to new and useful improvements in hinges for automobile seats or chairs and has for its primary object the provision of means for efficiently connecting the back portion to the seat portion of an automobile chair to permit of the back portion to remain firm when in chair-forming position and to permit of said back portion to be folded downwardly into a horizontal plane with the seat portion and the rear seat cushion of the automobile, thereby providing a comfortable bed out of the chair and the rear seat of the automobile.

Another object of this invention is to provide a device of the above stated character, which shall be simple, durable and efficient and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings wherein:—

Figure 1 is a side elevation illustrating the back portion of the chair in a bed-forming position and illustrating in dotted line the back portion in chair-forming position.

Figure 2 is a top plan view illustrating the same.

Figure 3 is a detail sectional view illustrating the hinge.

Figure 4 is a sectional view taken at right angles to Figure 3 and illustrating the means for locking the hinge in chair-forming position.

Figure 5 is a detail perspective view illustrating one section of the hinge.

Referring in detail to the drawings, the numeral 1 indicates an automobile chair including a seat portion 2 and a back portion 3 and the chair 1 is adapted for the front seat in an automobile and includes a seat frame 4 supporting the usual cushion and has formed on its forward corners ears 5 to which brackets 6 are pivoted and the brackets are bolted or otherwise secured to the flooring of the automobile. The chair 1 is customarily employed in the type of automobile body known as a two-door sedan or coach and the chair is arranged in advance of the rear seat 7 and opposite the doorway consequently rendering it necessary to swing the chair forward to permit a person to enter the automobile to the rear seat 7 and the pivotal connections between the extensions 5 and the brackets 6 permit the swinging of the chair when desired. The rear end of the frame 4 is supported by legs 8 and which extend above the frame 4 on each side of the cushion of the seat portion 2 and have their upper end bifurcated to form spaced ears 9 which cooperate with a bore 10 in forming horizontally disposed shoulders 11.

The back portion 3 has secured to its lower corners arms 12 which are reduced to form hinge extensions 13 having slots 14 to receive bolts 15 that extend through the ears 9 of the legs 8 and thereby hinge the back portion 3 to the seat portion 2. The arms 12 being reduced to form the extensions 13 form shoulders 16 adapted to rest upon the shoulders 11 when the back portion 3 is disposed in a chair-forming position as shown in dotted lines in Figure 1 with the extensions 13 disposed in the bores 10 of the legs 8 consequently firmly supporting the back portion 3 in a vertical position and to prevent accidental displacement of the back portion from chair-forming position, set bolts 17 may be provided and are carried by the legs 8 and are adapted to pass through the slots 14 adjacent their lower ends and thereby prevent accidental upward movement of the extensions 13 in the bores 10.

A substantially U-shaped member 18 has its ends hinged to the back portion 3 as shown at 19 to form a robe or cloak rack when the back portion 3 is in a seat-forming position and when the seat portion 3 is swung horizontally into a plane with the seat portion 2 and the rear seat 7, the member 18 engages the floor of the automobile to cooperate with the hinge elements in firmly supporting the back portion 3 between the chair and the rear seat consequently providing a very firm section between the rear seat and the chair so that a person may comfortably rest or lie down within the automobile.

When the back portion 3 of the chair is disposed horizontally as shown in full lines in Figure 1 the extensions 13 are positioned horizontally to rest on the shoulders 11 with the shoulders 15 into engagement with the legs 8 thereby preventing the back portion 3 from moving below a horizontal position or below the plane of the seat portion 2 and the rear seat 7. The back portion 3 is capable of being swung into a vertical position by sliding the extensions 13 along the bolts 15 and at the same time swinging the back portion upwardly and when in a substantially vertical position, the extensions 13 may be set into the bores 10 to firmly support the back portion 3 in chair-forming position.

While I have shown and described the preferred embodiment of my invention, it will be understood that minor changes in construction, combination and arrangement of parts may be made without departing from the spirit and scope of the invention as claimed.

Having thus described my invention, what I claim is:

An automobile chair comprising rear legs of a hinged seat of a chair and having the upper ends bifurcated to provide spaced apertured ears and the inner walls of the bifurcations providing rests, said legs having sockets opening outwardly through the rests between the ears, pins connecting the ears and disposed in alinement with the sockets, and arms attached to the back of the chair and having reduced elongated slotted members with the pins extending though the slotted portions thereof to slidably connect the arms to the legs for permitting said arms to extend into the sockets with the large portions of said arms disposed between the ears and engaging the rests when the back is in a chair-forming position and to permit the back to be positioned in horizontal alinement with the seat and with the arms at right angles to the legs and disposed between the ears in engagement with the rests with the large portions of the arms abutting the sides of the legs.

DAN B. OLIVER.